Nov. 22, 1949     G. H. JUDKINS     2,488,726
LIQUID FILTER
Filed July 30, 1945     2 Sheets-Sheet 2
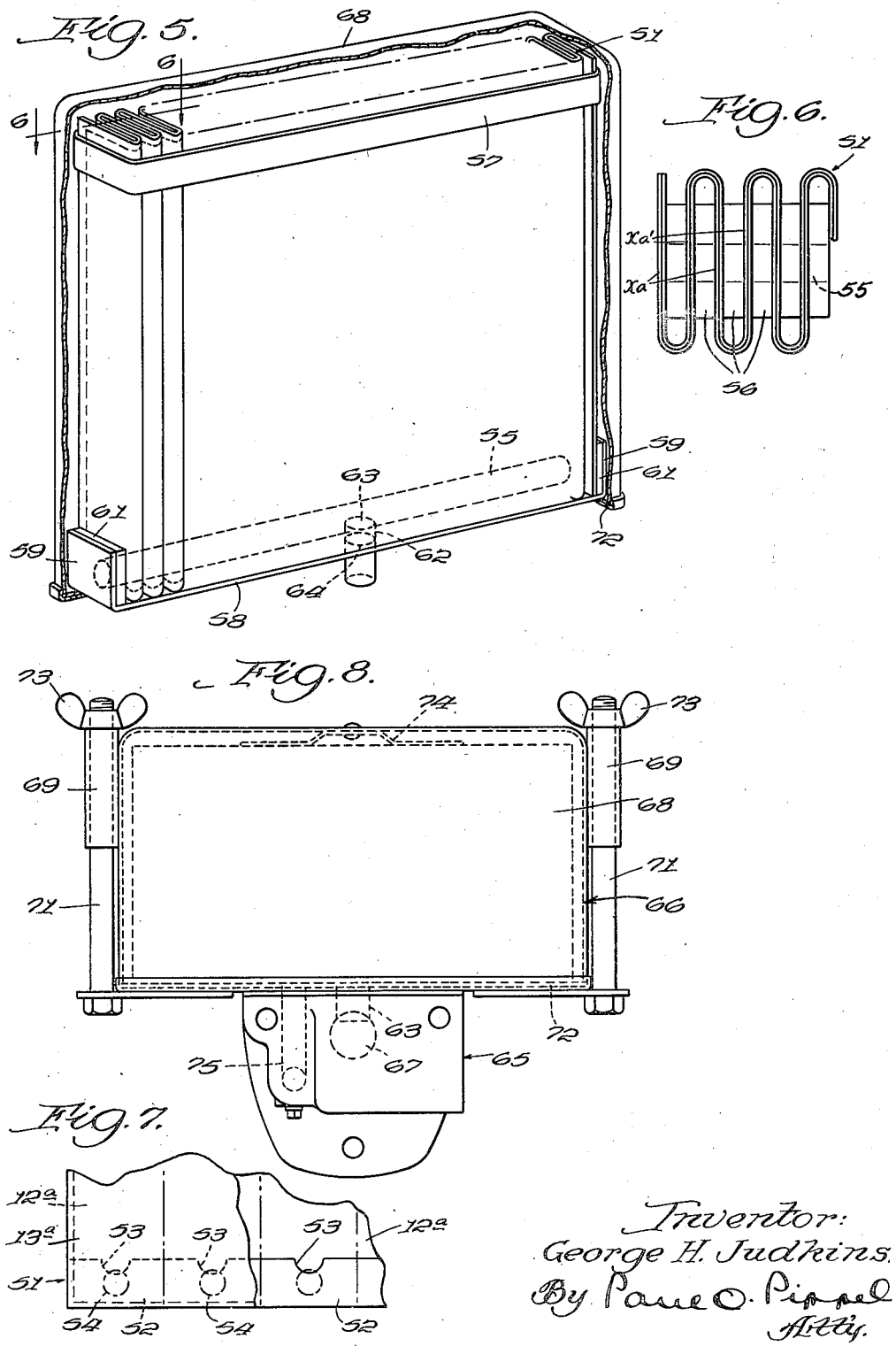
Inventor:
George H. Judkins.
By Paul O. Pippel
Atty.

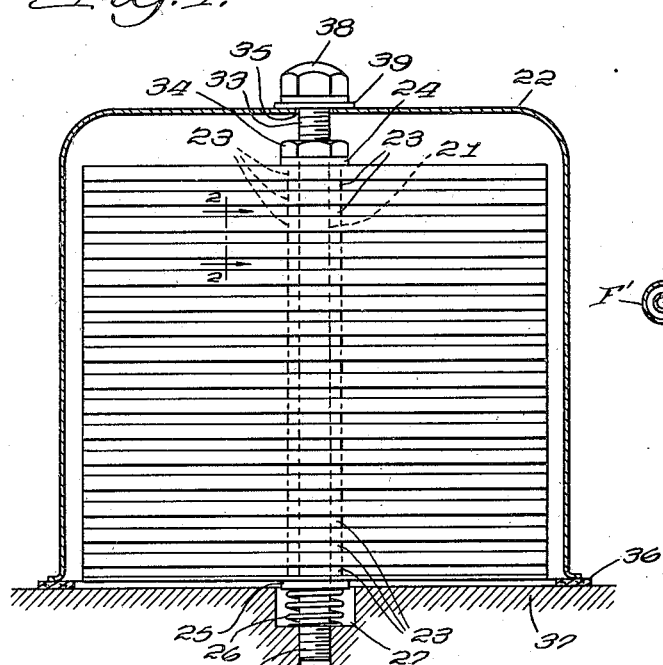
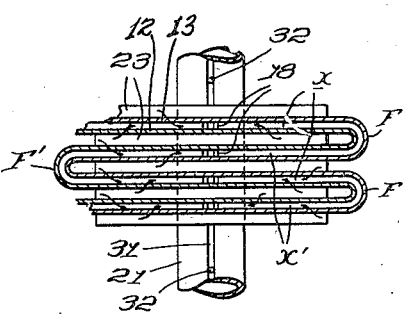
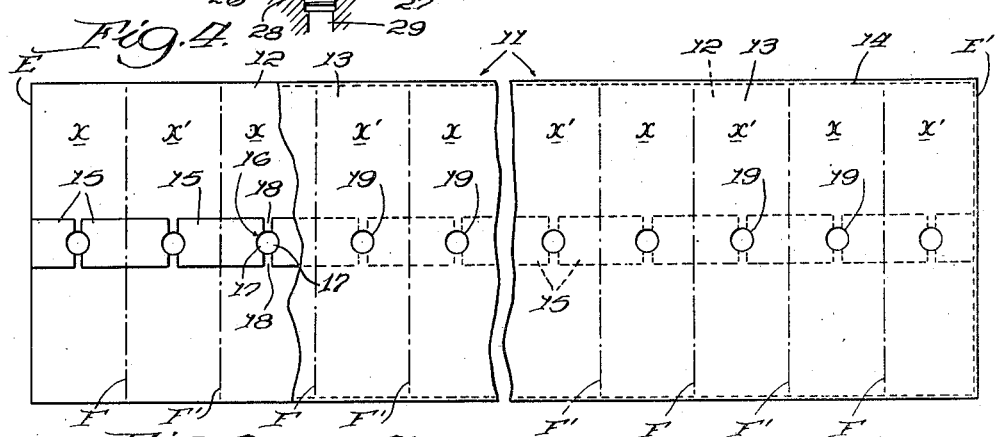
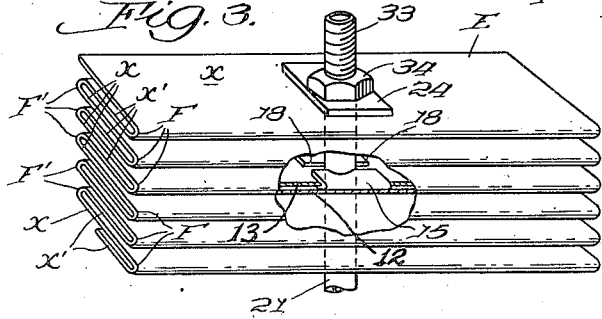
Inventor:
George H. Judkins.

Patented Nov. 22, 1949

2,488,726

UNITED STATES PATENT OFFICE 2,488,726

LIQUID FILTER

George H. Judkins, Berwyn, Ill., assignor to International Harvester Company, a corporation of New Jersey Application July 30, 1945, Serial No. 607,691

2 Claims. (Cl. 210—169)

This invention concerns fluid filters of the type embodying an envelope having thin filtering walls and operable when immersed in and urged collapsed by a body of fluid filterable inwardly through such walls. More specifically, the invention includes such a filter which is folded to cluster sections of the envelope for improving its space-occupying factor, together with drainage means for conducting filtered fluid from the interior of the clustered sections.

Thus far, filters of the collapsible envelope species have had their filtering walls formed of filter paper which has been treated with suitable preservatives or reinforcing agents when used for filtering fluids requiring such treatment. This species of filter is desirable from the standpoint of providing a large filtering area in a space of small volume. The cost of production is also an important consideration for these filters since it is necessary to periodically replace the filtering envelope. The fact that paper which is an inexpensive filtering medium is used in the replaceable elements of these filters has materially contributed to their attractiveness, although such elements have included parts in addition to the filter paper.

One object of this invention is the provision of a replaceable filter element which diminishes the relative amount of material not constituting the actual filtering medium therein.

A further object is the provision of a novel filter envelope drainage means utilizable in conjunction with an envelope convoluted into a formation adapting it to occupy a small easily encased space.

A further object is the provision of a drainage system for a replaceable convoluted filtering envelope wherein a duct of such system embodies transverse sections constituting axially registering holes in the envelope.

Still a further object is the provision of a new filtering apparatus wherein part of the drainage duct means for a replaceable convoluted filtering envelope remains permanently associated with the chamber therefor, thereby resulting in the discardable element containing virtually only the filtering medium.

The above and other desirable objects inherent in and encompassed by the invention will be more fully understood upon reading the ensuing description with reference to the annexed drawings, wherein:

Fig. 1 is a sectional view taken through a casing containing a replaceable filtering envelope unit shown in elevation and embodying a preferred form of the invention;

Fig. 2 is a fragmentary sectional view taken on the line 2—2 of Fig. 1;

Fig. 3 is an enlarged fragmentary perspective view of a portion of the envelope shown in Fig. 1 and having a portion broken away to illustrate the assembly of this envelope and of internal side wall spacing means thereof with a drainage tube;

Fig. 4 is a plan view of the filter envelope of Fig. 1 while flat preparatory to being folded to effect the reverse convolutions shown in Figs. 2 and 3;

Fig. 5 is a perspective view of a casing having its side wall broken away for disclosing a modified form of filtering envelope in perspective contained therein;

Fig. 6 is a fragmentary view taken on the line 6—6 of Fig. 5 illustrating the formation of the convolutions of the filter element and the disposition of spacer elements between these convolutions;

Fig. 7 is a fragmentary plan view of a portion of the envelope of Fig. 5 while in the flat condition prior to formation of the envelope convolutions, a wall portion of the envelope fragment being broken away to illustrate a spacer strip contained therein;

Fig. 8 is a side elevational view of a casing for replaceably receiving this second embodiment of filter element.

With continued reference to the drawings, there is shown in Fig. 4 a flat envelope which is adapted to be bent into the convoluted condition illustrated in Figs. 1, 2, and 3. This envelope which is generally indicated 11 comprises two identical elongated sheets 12 and 13 of filter paper. Said sheets are connected together about their edges by a line 14 of ordinary machine thread stitching 14. This stitching establishes essentially a sealing connection between the sheets 12 and 13 about their edges. Other sealing means, such as a suitable adhesive, may be employed in lieu of the stitching 14 if desired. A spacer means comprising a strip-like row of spacer elements 15 is contained within the envelope where it occupies a narrow band-like zone extending lengthwise of the envelope between its ends E and E'. Cutaway sections 16 of the spacer means may be formed by the cutting away of material from a continuous strip initially including the spacer elements 15. Each cutaway section 16 comprises opposed arcuate portions 17 and diametrically opposite drainage port portions 18, the latter serving as drainage ports for the envelope as pointed out more particularly hereinafter. Said continuous strip (from which the elements 15 are to be formed) preferably has notched edges and is so assembled between the filter sheets that the notches or gaps in such edges respectively form the drainage port portions 18. With the sheets and strip so assembled the arcuate portions 17 are cut pursuant to the cutting of holes 19 completely through the envelope side walls 12 and 13. This hole-cutting operation removes those portions of the continuous strip that were between oppositely disposed notches thereof coinciding with the drainage port portions 18 and thereby culminates the formation of the isolated elements 15. Said continuous strip is held in position by the stitching 14 at the envelope ends E—E', but the frictional engagement between the convoluted envelope and the discrete elements 15 is adequate to prevent displacement of the latter. A section of the filtering sheet or envelope wall 13 has been removed from the left-end portion of the envelope to expose the inner surface of the sheet 12 and some of the spacer elements 15. These holes 19 are centered with reference to respective envelope sections X and X' which are arranged alternately lengthwise of the envelope and separated by parallel folded lines F and F'.

With the envelope prepared with the holes 19 and the internal spacing means as illustrated in Fig. 4, it and such spacer means thereof are next folded with reverse folds along the lines F and F', a fold in one direction being made about the fold lines F and the fold in the opposite direction about the lines F' as illustrated in Figs. 2 and 3. This causes the envelope hollow sections X and X' to be disposed alternately and in flatwise opposed relation to such sections as are adjacent to one another. In other words the folded envelope has reverse convolutions successively coincident with the fold lines F and F', causing a series of hollow envelope sections X and X' to exist in juxtaposed flatwise relation to adjacent thereof, i. e., in Figs. 1, 2, and 3 each of the hollow envelope sections X and X' is disposed flatwise to the other of such sections next adjacent thereto. When the envelope is folded to produce the convolutions in the manner just described, all the envelope side wall holes 19 and the spacing means hole portions 17 will be in axial registry adapting the envelope unit to be telescopically assembled onto a tubular member or stud 21 projecting upwardly into a casing portion 22 illustrated in Fig. 1. In the folding of the envelope for effecting the convoluted formation thereof, the spacer elements 15 provide spacing material between the sheets 12 and 13 at the folded sections F and F' and in this manner serve to prevent the curvature at the sections being so acute as would strain or rupture these sheets.

Prior to such assembly with the tube 21, however, the convoluted envelope has assembled therewith a plurality of external spacer members 23. These spacer members 23 are inserted between each of the opposed hollow envelope sections X and X' and have holes therein which register with the envelope holes 19 so that said spacer members are assembled onto the hollow stud or tube 21 with the convoluted envelope. End seal members 24 and 25, which also contain holes for receiving the tube 21, are assembled thereon as illustrated with the convoluted envelope. The lower sealing member 25 is yieldably supported upon the upper end of a sealing spring 26 of which the lower end reacts upon the bottom of a recess 27 in the lower wall of the filter-element-receiving chamber which includes the removable casing member 22.

The tubular stud 21 has a threaded lower end portion 28 turned into and communicative with a casing channel 29 into which fluid filtered by the apparatus is discharged. Diametrically opposite grooves 31 extend lengthwise of and are formed in that portion of the tubular stud which is covered by the convoluted envelope and spacer members assembled on the stud. Perforations 32 spaced lengthwise of the grooves 31 provide communication therefrom interiorly of said stud. The rotative position of the tubular stud is such that the grooves 31 register with the notches or port-forming means 18 in the internal spacer means 15. If the holes 19 were slightly greater in diameter than that portion of the stud 21 received thereby, it would be unnecessary to provide the grooves 31 and unnecessary for any circumferential part of the stud to register with the port forming notches 18.

A threaded upper end portion 33 of the tubular stud has a nut 34 turned downwardly thereonto for compressing the sealing members 24 and 25, the spacer members 23, the spacer means 15, and the side walls of the envelope hollow sections X and X' axially of the tube. In this manner hole-containing portions of the hollow sections, that is, the material of the envelope side walls immediately about holes 19 and the spacer members 23 are compressed together to effect a duct receiving the tubular stud and of which duct said holes constitute axially spaced transverse sections or constituents. This duct together with the axial grooves 31 in the hollow stud constitute part of a drainage duct means for the convoluted envelope, this drainage duct means being directly communicative with the interior of each envelope hollow section X and X' respectively through the drainage ports 18 formed between the interior spacer elements 15.

After the nut 34 has been screwed down for establishing an effective sealing contact relation between the spacer members 23 and exterior portions of the envelope walls immediately about the openings 19, the removable portion 22 of the casing is telescoped over the unit and onto the stud 33, a hole 35 in the upper end wall of the casing portion 22 being receptive of said stud. A gasket 36 is disposed between the lower rim of the casing portion 22 and a casing wall 37 containing the discharge duct 29 for the filtered fluid. A cap nut 38 having a gasket 39 therebeneath is then threaded onto the upper end of the tubular stud for closing the upper end thereof and for pressing the rim of the casing portion 22 into firm sealing relation with the gasket 36.

In the operation of the apparatus assembled as illustrated in Fig. 1, a fluid such as oil is introduced into the chamber 22—37 under pressure through an inlet conduit not shown. This fluid completely fills the chamber and exerts pressure equally upon all exterior surfaces of the envelope hollow sections X and X' and thereby tends to collapse them. However, the interior surfaces of these envelope sections are not so smooth nor do they lay together with such a degree of conformity but what the fluid entering the envelopes through each of their side walls, as indicated by the arrows in Fig. 2, can flow to the ports 18 and thence into the drainage duct means, formed by the envelope holes 19, the stud groove 31, openings 32 in such groove, and the interior of said stud for delivery into the discharge duct 29 as filtered fluid.

In the embodiment shown in Figs. 5 to 8, a convoluted envelope 51 having side walls of filtering material such as paper is formed flat and subsequently folded similarly to the manner described hereinabove with respect to the envelope 11. However, this envelope, of which the side walls corresponding to the side walls 12 and 13 of the first embodiment are respectively designated 12$^a$ and 13$^a$, has a spacer strip 52 (in lieu of the spacer elements 15) assembled therewith adjacently to one of the long edges of the envelope. This spaced strip 52 has notches 53 formed in an edge thereof for partial registry with circular areas 54 where holes are to be drilled and which are so disposed in the convoluted envelope as to register with a section at which a drainage channel designated 55 in Fig. 5 is to be drilled incident to forming such holes. Upon the drilling of the channel 55 through the envelope wall areas 54 and also through the bodies of spacer members 56, Fig. 6, the notches 53 will serve as ports directly communicating between this channel and respective of the envelope sections $Xa$ and $Xa'$ which respectively correspond to the sections X and X' of the first embodiment. The spacer elements are substantially square, i. e., their height is such that they reach only slightly higher than the upper ends of the channel 55.

The envelope is retained in the folded condition by a retaining band 57 and by a C clamping member 58. This clamping member is preferably formed of a resilient metal so that the upturned end sections 59 thereof can be spread to facilitate insertion of the lower end of the folded element and to thereafter contract for tightly holding such element so the outer surfaces of the envelope hollow sections immediately surrounding the holes formed therein by the drilling of the duct 55 and the contiguous surfaces of the spacer members 56 will be maintained in sealing contact and thereby prevent transverse communication with the duct 55 excepting from the hollow envelope sections $Xa$ and $Xa'$ through the ports provided by the notches 53. Solid sealing blocks 61 are interposed between the upturned ends of the clamp 58 and the adjacent side wall portions of the envelope to close the ends of the duct 55. A lateral bore 62 is drilled through the body of the envelope and certain of the spacer members 56 intersected thereby, and this bore has a nipple member 63 inserted tightly thereinto. A hole 64 in the clamping member 58 accommodates the nipple.

The element consisting of the envelope 51, the retaining band 57, C clamp 58, and the nipple 63 constitutes a replaceable element. This element is detachably mounted on the base 65 of a casing 66 by inserting the nipple into an end of an outlet duct 67. A removable portion 68 of the casing containing stud-receiving ears 69 is adapted to receive the mounted element when placed thereover incident to the reception of base mounted studs 71 into said ears. The lower rim of the removable casing portion 68 fits onto a gasket 72 on the base 65 and establishes a sealing connection therewith when wing nuts 73 are turned downwardly on the studs against the upper ends of the ears 69. A leaf spring 74 in the removable portion of the casing is adapted to press upon the upper end of the mounted element to prevent the nipple 63 shaking loose from its connection with the outlet passage 67. Liquid to be filtered by the element is introduced into the casing through a base channel 75 which communicates with the interior of the casing through the upper side of the base. In the operation of this replaceable filtering element, the fluid filters inwardly through the envelope walls in the manner described hereinabove in connection with Fig. 2, and this filtered fluid flows lengthwise of the hollow envelope sections $Xa$ and $Xa'$ to the ports formed by the spacer notches 53 and thence into the duct 55 and outwardly of the filtering element through the nipple 63 into the outlet passage 67 of the base 65.

Having thus described a limited number of embodiments of the invention with the view of clearly illustrating the same, I claim:

1. In filtering apparatus for fluids, a long thin envelope having opposed contiguous sheet-like filtering walls through which fluid is filterable into the envelope from a fluid body ambient thereto, separator means extending lengthwise of the envelope and lying flatly between said walls along a narrow band-like zone thereof, said envelope being bent into a series of reverse convolutions extending transversely thereof to effect a series of hollow envelope sections of which adjacent ones thereof are in flatwise opposed relation and said separator means also being bent to conform to said convolutions, and means for draining said envelope comprising holes placed in the walls of said hollow envelope sections at portions registering with said separator means, said hole-containing wall portions of the convoluted envelope being assemblable into a transversely laminated drainage - duct - containing structure wherein said holes form respective transverse sections of the duct therein, and said separator means having gaps registering with said duct and providing ports directly communicative between said duct and the interior of said envelope sections.

2. In filtering apparatus for fluids, an axially channelled stem, a long thin envelope having opposed contiguous sheet-like filtering walls through which fluid is filterable from a fluid body ambient thereto, said envelope being bent into a series of reverse convolutions extending transversely thereof to effect a series of hollow envelope sections of which adjacent ones thereof are in flatwise opposed relation, a series of holes in said walls within said hollow sections and disposed for registration when said sections are in said flatwise opposed relation, said envelope being mounted on said stem with said registered holes embracing the same, means compressing said mounted envelope axially of the stem at the areas immediately about said holes to effect a duct of which said holes are transverse constituents, spacers circumscribing said stem respectively within said envelope hollow sections and having ports communicative between the interior of their associated sections and said duct, means establishing sealing connections between the envelope and said stem at the ends of said duct, and means providing communication between said duct and the channel in said stem.

GEORGE H. JUDKINS.

REFERENCES CITED

The following references are of record in the file of this patent:

UNITED STATES PATENTS

| Number | Name | Date |
|---|---|---|
| 2,103,572 | Wells | Dec. 28, 1937 |
| 2,279,423 | Vokes | Apr. 14, 1942 |
| 2,359,475 | Gauthier | Oct. 3, 1944 |
| 2,372,865 | Taylor | Apr. 3, 1945 |

FOREIGN PATENTS

| Number | Country | Date |
|---|---|---|
| 16,237 | Great Britain | of 1907 |
| 516,827 | France | Dec. 10, 1920 |
| 292,719 | Great Britain | June 28, 1928 |
| 401,287 | Great Britain | Oct. 30, 1933 |